United States Patent [19]

Chen

[11] 4,236,074
[45] Nov. 25, 1980

[54] RADIOACTIVE HEIGHT SENSOR FOR AUTOMATIC LEVEL CONTROL

[75] Inventor: Charles C. Chen, Kokomo, Ind.

[73] Assignee: General Motors Corporation, Detroit, Mich.

[21] Appl. No.: 32,697

[22] Filed: Apr. 23, 1979

[51] Int. Cl.² .................. G21K 7/00; B60G 11/28
[52] U.S. Cl. .................................. 250/308; 280/707
[58] Field of Search .................. 250/308, 357, 484; 280/6 R, 6.1, 6.11, 707

[56] References Cited

U.S. PATENT DOCUMENTS 4,017,099  4/1977  Hegel et al. .................. 280/707

OTHER PUBLICATIONS

Burns, Jerry W. "A Dry-Air Electronic-Controlled Leveling System for Passenger Cars and Light Trucks" SAE #780051.

Primary Examiner—Alfred E. Smith
Assistant Examiner—Janice A. Howell
Attorney, Agent, or Firm—Warren D. Hill

[57] ABSTRACT

A height sensor is provided in a vehicle leveling system having an air spring including a pressurized chamber connected between sprung and unsprung vehicle masses. Two radioactive material sources located within the chamber and attached for movement with the unsprung mass emits beta radiation which passes through the wall of the chamber and a pair of beta detectors outside the chamber and mounted on the sprung mass for movement therewith detects the beta radiation to determine the relative spacing of the sprung and unsprung masses.

3 Claims, 4 Drawing Figures

U.S. Patent    Nov. 25, 1980    4,236,074
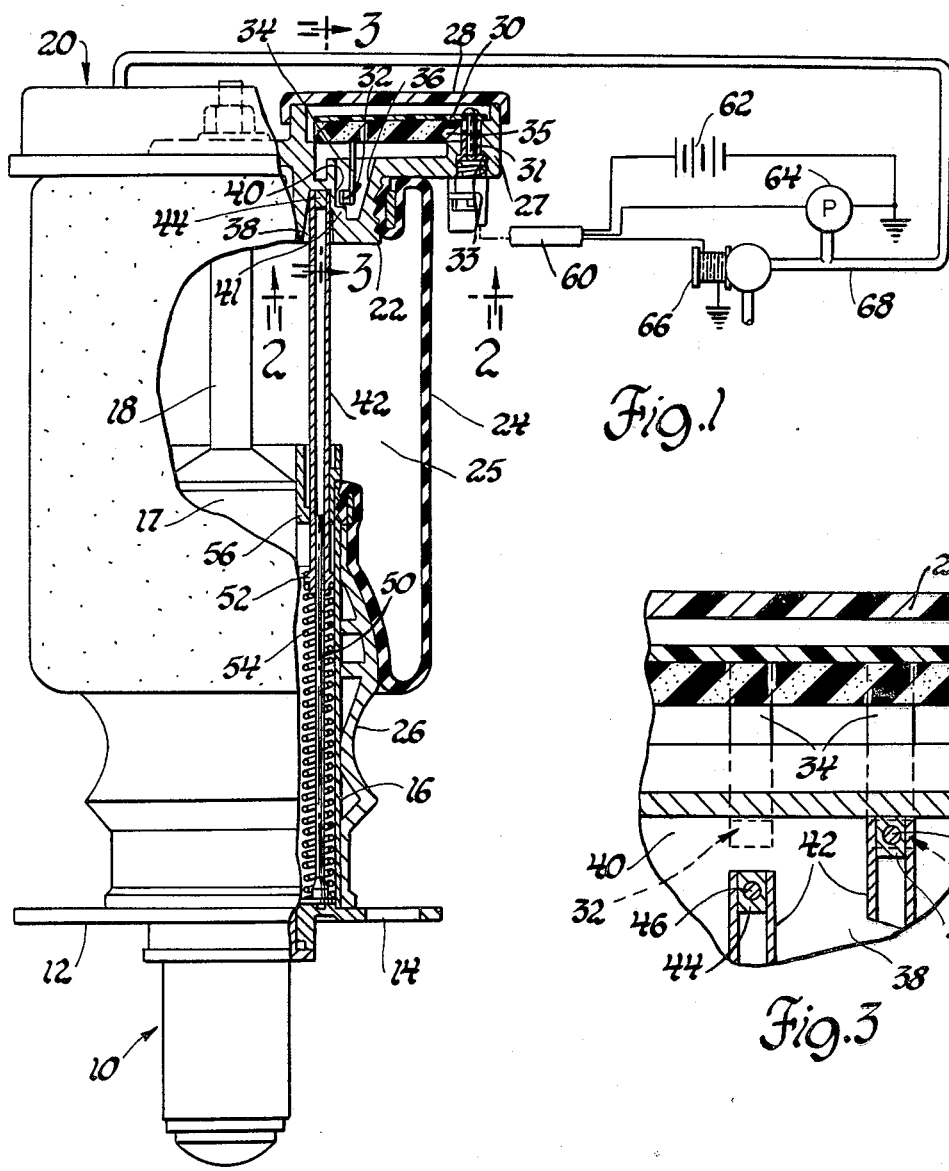
Fig.1
Fig.3
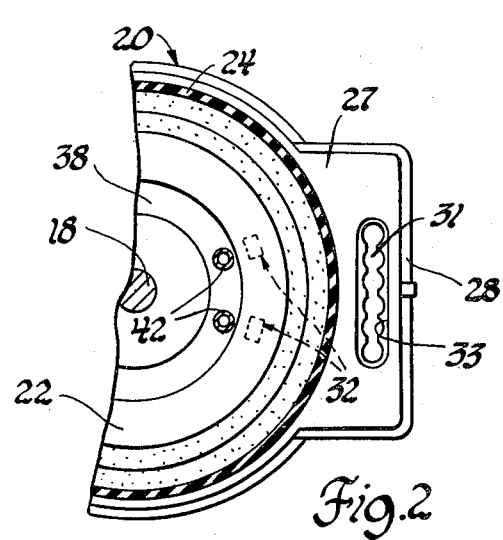
Fig.2
Fig.4

RADIOACTIVE HEIGHT SENSOR FOR AUTOMATIC LEVEL CONTROL

This invention relates to an automatic level control for automotive vehicles and particularly to a radioactive height sensor for such a level control.

It is known to use an adjustable shock absorber or an air spring/damper arrangement in the suspension of a vehicle to provide a controllable spring force to adjust the height between the sprung and the unsprung masses of the vehicle to a predetermined value. Various devices have been proposed to sense the height between those two vehicle masses for the purpose of controlling the pressure applied to a chamber of the controllable spring device. One example of such a height sensing and controlling arrangement is given in the SAE Publication No. 780051 "A Dry Air, Electronic-Controlled Leveling System for Passenger Cars and Light Trucks" by Jerry W. Burns. It is desirable that the height sensor be integrated with the air spring/damper assembly and that the sensing arrangement will be incorporated without breaching the integrity in the high pressure chamber of the air spring.

It is, therefore, a general object of this invention to provide a height sensor for an automatic level control which is readily integrated into the level control device. It is a further object to provide such a sensor which maintains the integrity of a pressure chamber in such a level control.

The invention is carried out by providing at least one beta radiation source and detector each connected to one of the sprung or unsprung masses of a vehicle wherein the degree of alignment of the source and detector is indicative of the height relationship between the masses, wherein the detector comprises a fluorescent material for emitting light when irradiated by beta radiation and a photosensor exposed to the light emitted thereby to produce an electrical signal for controlling the leveling system. It is contemplated that the source and detector will be mounted inside and outside, respectively, of a chamber of a spring device and the beta radiation will pass through the wall of the chamber.

The above and other advantages will be made more apparent from the following specification taken in conjunction with the accompanying drawings wherein like reference numerals refer to like parts and wherein:

FIG. 1 is a partly cross-sectioned elevational view of an air spring/damper incorporating a height sensor according to the invention;

FIG. 2 is a cross-sectional view of an air spring/damper taken along lines 2—2 of FIG. 1;

FIG. 3 is a vertical cross-sectional view of a portion of the air spring/damper taken along lines 3—3 of FIG. 1; and FIG. 4 is a diagrammatic illustration of a beta source and detector illustrating the operation of the height sensor according to the invention.

Referring to FIG. 1, a damper or shock absorber 10 of well known construction is secured at an airtight joint to a mounting plate 12 having an aperture 14 for receiving a fastener to secure the plate to the unsprung mass of a vehicle. A cylindrical sleeve 16 concentric with and spaced from the damper 10 is fastened at its lower end to the plate 12 in an airtight sealing engagement. The sleeve 16 extends up to the top of the body 17 of the damper 10 and is open ended. A piston rod 18 extending from the upper end of the damper 10 has its top secured to a cover 20 which comprises an aluminum casting having a downwardly projecting hub 22. A flexible boot 24 comprising the flexible portion of an air spring has one end secured to the circumference of the hub 22 and the other end is secured about the upper portion of the sleeve 16. An outer sleeve 26 surrounding the sleeve 16 has a varying diameter along its length and provides a surface against which the boot 24 lays when the air spring is at least partially compressed as shown in the drawing. The cover 20 is intended to be attached to the spring portion of the vehicle. Thus, an air chamber 25 for retaining pressurized air is defined by the plate 12, sleeve 16, boot 24 and cover 20.

To accommodate a height sensor, the cover 20 has formed at one side thereof a rectangular box 27 fitted with a plastic cover 28. A circuit board 30 containing an electronic circuit for the height control is secured within the box 26. The circuit board 30 includes terminal 31 at one edge thereof and a port 33 in the aluminum casting allows an electrical connector from a wiring harness to plug into the terminal 31. Except for the terminals, the component side of the circuit board is embedded in potting compound 35. A pair of beta radiation detectors 32 each mounted on a post 34 depends from the circuit board 30 and extend into a well 36 formed in the top surface of the cover 20. Another well 38 is formed in the bottom surface of the cover 20 adjacent to well 36 and separated therefrom only by a thin wall 40 of the aluminum casting which comprises the cover 20. The wall 40 is thin only in the region opposite the detectors. The wall thickness increases to a thick section 41 just below the thin portion 40. A pair of tubular standards 42 extend into the well 38 at locations aligned with the two detectors 32 and the top of each standard comprises a capsule 44 containing a beta source 46. The capsule 44 as well as the thick aluminum casting of the cover 20 provides shielding of the beta radiation. However, a window, not shown, allows radiation to pass toward the thin wall 40 in the direction of the corresponding radiation detector 32.

The standards 42 are supported on a pair of vertical guide rods 50 which are mounted on the mounting plate 12 in the space between the sleeve 16 and the damper 10. The lower end of the tubular standard 42 carries a radially extending flange 52. The standard 42 slides over the guide rod 50 in a telescoping manner. A coil spring 54 surrounding each guide rod is compressed between the base plate 12 and the flange 52 of the standard 42 to thereby urge the standard 42 upward toward the cover 20. A stop member 56 surrounding each standard 42 above the flanges 52 provides an abutment to engage the flange 52 on the standard to limit the upward movement of the standard. One standard 42 is shorter than the other so that when each are in their extreme upper position, as shown in FIG. 3, the beta sources 46 will be at different heights so that only one, at most, can be in alignment with the corresponding radiation detector 32. The standards are so designed that at the desired height (i.e. the height which signifies a level vehicle attitude) only the highest one of the beta sources 46 will be aligned with this corresponding detector to activate that detector. For heights which are too low, wherein the cover 20 is depressed relative to the mounting plate 12, the higher standard 42 is also depressed so that both standards contact the top of the well 38 and both of the beta sources 46 will be aligned with their corresponding detectors 32. On the other hand, when the height is too high, the cover 20 is separated from the mounting plate 12 by an amount exceeding the limit of travel of the higher standard 42 so that neither beta source 46 is aligned with a detector 32. Thus, one detector 32 is activated when the sprung mass is at its correct height, both detectors are activated when the sprung mass is too low and neither is activated when the sprung sprung mass is too high. The control circuit on the circuit board 30 then monitors the output of the detectors and generates control signals for changing the height when required.

The circuit board 30 is connected to a wiring harness 60 which includes a connection to a battery 62 to supply power to the control circuit, connection to an electrically driven compressor or air pump 64 to increase air pressure or to a solenoid exhaust valve 66 to decrease air pressure in the air spring. The pump and exhaust valve are connected to an air line 68 which is connected to a port, not shown, in the cover 20 for supplying air to or relieving air from the interior of the air spring. While a simplified air pressure control arrangement is proposed here, other control systems for maintaining appropriate pressure in an air spring are well known in the art as exemplified in the above-mentioned SAE Publication.

The beta radiation source and the detector arrangement are diagrammatically depicted in FIG. 4. The detector 32 supported on the posts 34 preferably comprises a photosensitive solid state device such as a phototransistor 70, and a coating of fluorescent material 72 applied to the phototransistor. The fluorescent material will emit light when in the presence of beta radiation from the source 46. The phototransistor will be energized by the emitted light when the beta source is opposite the detector 32, since the beta radiation can in part penetrate the thin wall 40 separating the beta source and the detector. When, however, the source 46 is in a lower position as depicted in dotted lines, the beta radiation incident of the detector 32 sharply declines because the source is no longer aligned with the detector and because the thick wall section 41 below the detector tends to shield the source from the detector. As a specific example of the source-detector arrangement, it is assumed that the source has an effective emission area of 4 mm$^2$ and the area of the thin wall 40 adjacent the detector 32 is of at least that same area. For a Krypton 85 beta emitter of 200 microcuries having a half life of 10.76 years and a maximum energy of 0.67 MeV, a 0.76 mm thick aluminum wall 40 is appropriate. The beta radiation passing through that section will have a maximum energy of 0.132 MeV and 12% will have been absorbed by the aluminum. The radiation striking the detector will produce $3.96 \times 10^8$ light photons per second in an organic phosphor of Anthracene having a conversion efficiency of 3 –4%. The peak emission spectra is 4450Å. Typical phototransistors will have a relative response of 20% at this wavelength. Other beta emitters such as Tritium, Strontium 90 and Promethium 147 may be used although the thickness of the aluminum wall and the activity of the source must be suitably altered. Similarly, other phosphors, both organic and inorganic, are usable to excite the photosensor. The organic phosphors can be Stilbene, P-Terphenyl and Naphthalene, for example, while inorganic phosphors include NaI (Tl) and ZnS (Ag).

It will be seen that the height sensor according to this invention is readily integrated with an air spring damper assembly and since the beta radiation passes through the thin aluminum section of the cover 20, the integrity of the air chamber defined by the cover 20 and the boot 24 is not breached.

The embodiments of the invention in which an exclusive property or privilege is claimed are defined as follows:

1. In an automatic vehicle leveling system a sensor for detecting the height relationship between the sprung and unsprung masses of the vehicle with respect to a predetermined height, comprising beta radiation detector means connected to and movable with one of the masses including photosensor means, a fluorescent material adjacent the photosensor means for emitting light when irradiated by beta radiation, and the photosensor means exposed to light emitted by the fluorescent material to produce an electrical output in response to the irradiation by beta radiation, and beta radiation source means connected to and movable with the other of the masses and positioned to irradiate the radiation detector means according to the height relationship between the masses, whereby the electrical output from the detector is indicative of the height relationship.

2. In an automatic vehicle leveling system a sensor for detecting the height relationship between the sprung and unsprung masses of the vehicle with respect to a predetermined height, the leveling system having a pressurized chamber connected between the said masses, comprising a portion of the pressurized chamber comprising a thin wall section pervious to beta radiation, beta radiation detector means connected to and movable with one of the masses and mounted on one side of the thin wall section, a fluorescent material adjacent the wall for emitting light when irradiated by beta radiation, and photosensor means adjacent the fluorescent material and exposed to light emitted thereby to produce an electrical output in response to the irradiation by beta radiation, and beta radiation source means connected to and movable with the other of the masses and positioned on the other side of the wall section to irradiate the radiation detector means through the wall according to the height relationship between the masses, whereby the electrical output from the detector is indicative of the height relationship.

3. In an automatic vehicle leveling system a sensor for detecting the height relationship between the sprung and unsprung masses of the vehicle with respect to a predetermined height, the leveling system having an adjustable air spring including a pressurized chamber for spacing the said masses, comprising;

a portion of the pressurized chamber comprising a thin wall section pervious to beta radiation, two beta radiation detectors connected to and movable with one of the masses and mounted on one side of the thin wall section, each detector comprising a solid state photosensor coated with fluorescent material and exposed to light emitted thereby, the fluorescent material emitting light when irradiated by beta radiation, so that each detector produces an electrical signal in response to the irradiation by beta radiation, and beta radiation source means connected to and movable with the other of the masses and positioned on the other side of the wall section to pass radiation through the wall section to irradiate the radiation detector means according to the height relationship between the masses, whereby the electrical signals from the detectors are indicative of the height relationship.

\* \* \* \* \*